C. S. DINGWALL.
FRUIT TREE PROP.
APPLICATION FILED AUG. 11, 1916.
1,214,142.
Patented Jan. 30, 1917.
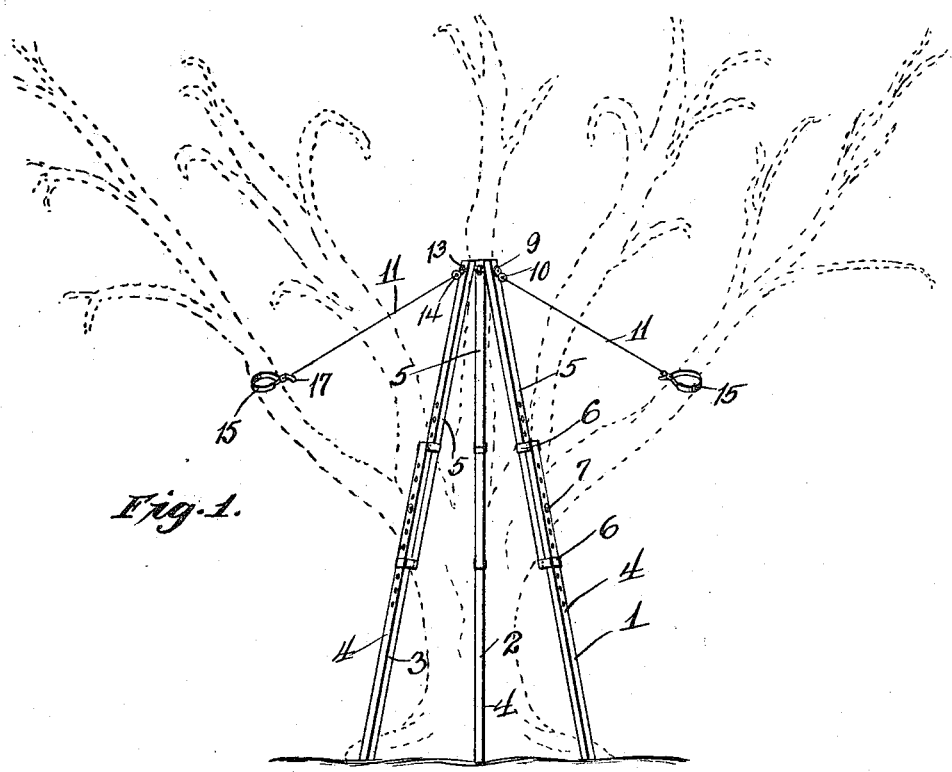
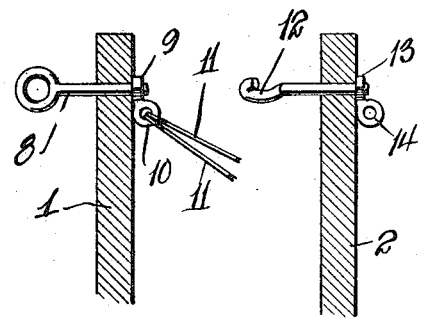
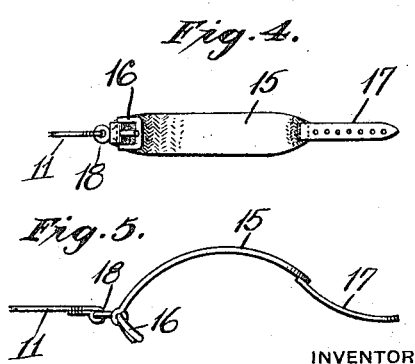
WITNESSES
W. C. Fielding
Wm H. Mulligan
INVENTOR
Charles S. Dingwall
BY Richard B. Owen
ATTORNEY

UNITED STATES PATENT OFFICE.

CHARLES S. DINGWALL, OF MEDFORD, OREGON.

FRUIT-TREE PROP.

1,214,142.    Specification of Letters Patent.    Patented Jan. 30, 1917.

Application filed August 11, 1916. Serial No. 114,450.

*To all whom it may concern:*

Be it known that I, CHARLES S. DINGWALL, a citizen of the United States, residing at Medford, in the county of Jackson and State of Oregon, have invented certain new and useful Improvements in Fruit-Tree Props, of which the following is a specification.

This invention relates to a fruit tree prop and more particularly to a device for use in connection with fruit trees which are laden with great quantity of ripening fruit whereby the branches of the tree may be supported for preventing them from being broken.

A further object of the invention is to provide an adjustable prop for frut bearing trees, especially adapted for young trees, the adjustment of the device permitting the same to be used with various sizes of trees.

A further object of this invention is the provision of a fruit tree prop which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which:

Figure 1 is a side elevation of the device showing the same in use. Fig. 2 is a detail section through the upper end of one of the supporting standards. Fig. 3 is a similar view through another of the supporting standards. Fig. 4 is a plan of one of the limb embracing straps. Fig. 5 is an edge view of one of the straps.

The device, when in assembled position is constructed to resemble a tripod and consists of three standards 1, 2 and 3. Each standard consists of the adjustable bars 4 and 5 and the lowermost bar 4 carries the yokes 6 through which the end of the bar 5 is passed so that the two bars 4 and 5 of each standard may be vertically adjusted to various lengths. The engaging ends of the bars 4 and 5 are provided with a plurality of apertures through which a locking pin 7 may be passed when certain of the apertures are brought into registration for holding the bars in adjusted position. The upper end of the standard 1 carries an eye bolt 8 fastened to the standard by the nut 9 as clearly shown in detail in Fig. 2 of the drawing. Integrally formed with the nut 9 is an eye loop 10 for receiving the ends of the guy wires 11 the props of which will be presently described. The upper ends of each of the standards 2 and 3, which are identical in construction and one of which is shown in detail in Fig. 3, is provided with the retaining hook 12 fastened to the standard by the nut 13 similar in construction to the nut 9 and also carries an eye loop 14. The hooks 12 are adapted to be caught in the eye bolt 8 for holding the upper ends of the standards 1, 2 and 3 together when the device is in use.

A limb embracing strap 15 is provided, shown in detail in Figs. 4 and 5 and has one end provided with a buckle 16 and its opposite end provided with a relatively narrow strap 17 which may be secured to the buckle 16 when the strap 15 is passed around one of the limbs of the tree. Secured to the end of the strap, adjacent the buckle 16 is an eye loop 18 adapted to receive the ends of the guy wire 11 for establishing communication between the upper ends of the supports 1, 2 and 3 with the straps 15.

It will be observed that the weight of the limbs of the tree, when they are attached to the straps 15 will pull the guy wires 11 sufficiently to cause the hooks 12 to pull upon the eye bolt 8 so that no additional fastening element is necessary. The guy wires may be adjusted to any desired length for raising or lowering the limbs of the tree to the desired angle.

From the foregoing it will be observed that a very simple and durable fruit tree prop has been provided, the details of which embody the preferred form. I desire it to be understood however, that slight changes in the minor details of construction may be made without departing from the spirit of the invention or the scope of the claims hereunto appended.

I claim:

1. A tree prop comprising a plurality of supporting standards, a plurality of hooks connected to certain of the said standards at their upper ends, means carried by the end of one of the retaining standards for cooperation with the said hooks whereby the ends of the standards may be held together, fastening elements for each of said hooks, and eye loops associated with the fastening means.

2. A tree prop comprising a plurality of supporting standards, means carried by the end of each standard and mutually coöperating for retaining the ends of the standards in close relation, the said means including nuts in engagement with the standards, eye loops integrally formed with the nuts, and retaining means secured to the said eye loops.

3. A tree prop comprising a plurality of supporting standards, an eye bolt carried by the upper end of one of the standards, hooks carried by the upper end of each of the other standards, the said hooks and the said eye bolt coöperating to hold the ends of the standards together, and retaining means secured to the upper ends of the standards.

4. A tree prop comprising a plurality of supporting standards, an eye bolt carried by the upper end of one of the standards, hooks carried by the upper end of each of the other standards, the said hooks and the said eye bolt coöperating to hold the ends of the standards together, nuts mounted on each of the said hooks and said eye bolt for fastening the same to the said standards, each of said nuts carrying an integrally formed eye loop, and retaining means secured to the said eye loops.

5. A tree prop comprising a plurality of supporting standards, an eye bolt carried by the upper end of one of the standards, means carried by the other standards and engageable with the said eye bolt for mutual coöperation whereby the said standards may be held together, eye loops associated with the said eye bolt and said means, one of the said eye loops being mounted upon each standard, and retaining means secured to the said eye loops.

In testimony whereof I affix my signature in presence of two witnesses.

CHARLES S. DINGWALL.

Witnesses:
W. A. FOLGER,
T. W. MILES.

Copies of this patent may be obtained for five cents each, by addressing the "Commissioner of Patents, Washington, D. C."